United States Patent
Zhang et al.

(10) Patent No.: US 11,159,430 B2
(45) Date of Patent: Oct. 26, 2021

(54) LOAD BALANCING OF THROUGHPUT FOR MULTI-PHY NETWORKS USING DECISION TREES

(71) Applicant: Cisco Technology, Inc., San Jose, CA (US)

(72) Inventors: Lele Zhang, Shanghai (CN); Chuanwei Li, Shanghai (CN); Li Zhao, Shanghai (CN); Yajun Xia, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/518,130

(22) Filed: Jul. 22, 2019

(65) Prior Publication Data
US 2021/0029038 A1 Jan. 28, 2021

(51) Int. Cl.
*H04L 12/803* (2013.01)
*H04L 12/24* (2006.01)
(Continued)

(52) U.S. Cl.
CPC .......... *H04L 47/125* (2013.01); *G06N 20/00* (2019.01); *H04L 41/0816* (2013.01);
(Continued)

(58) Field of Classification Search
None
See application file for complete search history.

(56) References Cited

U.S. PATENT DOCUMENTS

| 2003/0223357 A1* | 12/2003 | Lee | H04L 45/22 370/218 |
| 2009/0067348 A1* | 3/2009 | Vasseur | H04L 45/50 370/256 |

(Continued)

FOREIGN PATENT DOCUMENTS

| CN | 107220732 A | 9/2017 |
| KR | 2011116569 | 10/2011 |
| WO | WO-2014166427 A1 | 10/2014 |

OTHER PUBLICATIONS

Ahmed et al., "Cluster head selection using decision trees for Wireless Sensor Networks," 2008 International Conference on Intelligent Sensors, Sensor Networks and Information Processing, https://ieeexplore.ieee.org/document/4761982, 2008, pp. 173-178.

(Continued)

*Primary Examiner* — Anh Ngoc M Nguyen
(74) *Attorney, Agent, or Firm* — Behmke Innovation Group LLC; James J. Wong; James M. Behmke (57) ABSTRACT

In one embodiment, a technique for load balancing of throughput for multi-PHY networks using decision trees is provided. A first device of a mesh communication network may collect at least one transmission metric indicative of a primary link and a secondary link between the first device and a second device of the mesh communication network. The first device may provide the at least one transmission metric as input to one or more decision trees comprising one or more attributes that are each indicative of a threshold for a corresponding transmission metric. The first device may (Continued)

obtain an output from the decision tree comprising a selection of either the primary link or the secondary link. The first device may send, based on the output from the decision tree, one or more packets to the second device using the selected link.

20 Claims, 8 Drawing Sheets

(51) Int. Cl.
*G06N 20/00* (2019.01)
*H04L 12/721* (2013.01)
*H04L 12/26* (2006.01)
*H04L 12/753* (2013.01)

(52) U.S. Cl.
CPC .......... *H04L 43/0817* (2013.01); *H04L 45/38* (2013.01); *H04L 45/48* (2013.01)

(56) References Cited

U.S. PATENT DOCUMENTS

| | | | |
|---|---|---|---|
| 2011/0041002 A1* | 2/2011 | Saavedra | H04L 41/5077 714/4.11 |
| 2011/0307423 A1 | 12/2011 | Shotton et al. | |
| 2013/0070603 A1* | 3/2013 | Sahaly | H04L 47/11 370/237 |
| 2014/0036702 A1 | 2/2014 | Van Wyk et al. | |
| 2015/0023369 A1* | 1/2015 | Hui | H04B 1/713 370/463 |
| 2016/0072641 A1* | 3/2016 | Liang | H04L 61/6022 370/392 |
| 2018/0335309 A1* | 11/2018 | Pan | G01C 21/3453 |
| 2020/0007430 A1* | 1/2020 | Klemetti | G06N 20/20 |

OTHER PUBLICATIONS

Huang, et al., "Distributed Interference Compensation for Wireless Networks," IEEE Journal on Selected Areas in Communications, vol. 24, No. 5, http://www.ece.ubc.ca/~janm/Papers_RG/HuangBerryHonig_JSAC_May06.pdf, May 2006, pp. 1074-1084.

Manna et al., "A statistical approach to predict flight delay using gradient boosted decision tree," 2017 International Conference on Computational Intelligence in Data Science (ICCIDS), https://ieeexplore.ieee.org/document/8272656, 2017, pp. 1-5.

Meng et al., "A Communication-Efficient Parallel Algorithm for Decision Tree," https://arxiv.org/abs/1611.01276, Nov. 4, 2016, 9 pages.

Roy et al., "Decision tree based data classification for marine wireless communication," 2015 International Conference on Computing and Network Communications (CoCoNet), https://ieexplore.ieee.org/document/7411255, 2015, pp. 633-638.

"Decision tree," https://en.wikipedia.org/wiki/Decision_tree, printed Nov. 27, 2018, 6 pages, The Wikimedia Foundation, Inc.

"Decision support system," https://en.wikipedia.org/wiki/Decision_support_system, printed Nov. 27, 2018, 7 pages, The Wikimedia Foundation, Inc.

"Tree (graph theory)," https://enwikipedia.org/wiki/Tree_(graph_theory), printed Nov. 27, 2018, 7 pages, The Wikimedia Foundation, Inc.

"Causal Model", https://enwikipedia.org/wiki/Causal_model, printed Nov. 27, 2018, 15 pages, The Wikimedia Foundation, Inc.

"Decision Analysis", https://enwikipedia.org/wiki/Decision_analysis, printed Nov. 27, 2018, 4 pages, The Wikimedia Foundation, Inc.

"Decision Tree Learning", https://enwikipedia.org/wiki/Decision_tree_learning, printed Nov. 27, 2018, 9 pages, The Wikimedia Foundation, Inc.

"Operations Research", https://enwikipedia.org/wiki/Operations_research, printed Nov. 27, 2018, 11 pages, The Wikimedia Foundation, Inc.

* cited by examiner

LOAD BALANCING OF THROUGHPUT FOR MULTI-PHY NETWORKS USING DECISION TREES

TECHNICAL FIELD

The present disclosure relates generally to computer networks, and, more particularly, to the load balancing of throughput for multi-PHY networks using decision trees.

BACKGROUND

Many network communication protocols have been defined over the years based on particular situations, such as for large-scale networks, wireless networks, low-power and lossy networks (LLNs), and, in particular, industrial automation. LLNs, such as those utilized in Internet of Things (IoT) mesh network deployments, face a number of communication challenges. Unfortunately, such networks oftentimes communicate over a first communication medium (e.g., wireless) that is strongly affected by environmental conditions that change over time. Some examples include temporal changes in interference (e.g. other wireless networks or electrical appliances), physical obstruction (e.g. doors opening/closing or seasonal changes in foliage density of trees), and propagation characteristics of the physical media (e.g. temperature or humidity changes).

When mesh network nodes experience wireless transmission problems, "multi-PHY" mesh network nodes (i.e., with two physical-layer or "PHY" interfaces) may be configured to communicate over a second medium (e.g., powerline) in lieu of the first medium. The mesh network nodes, however, are typically configured to, prior to communicating over the second medium, perform multiple retransmission attempts over the first medium, thereby increasing latency due to the retransmission attempts (and a backoff time penalty). Further, given that the mesh network nodes are often configured to only communicate over the second medium when the first medium fails, data throughput provided by the second medium oftentimes goes unused.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a technique for load balancing of throughput for multi-PHY networks using decision trees is provided. A first device of a mesh communication network may collect at least one transmission metric indicative of a primary link and a secondary communication link between the first device and a second device of the mesh communication network. The first device may provide the at least one transmission metric as input to one or more decision trees comprising one or more attributes that are each indicative of a threshold for a corresponding transmission metric. The first device may obtain an output from the decision tree comprising a selection of either the primary link or the secondary link. The first device may send, based on the output from the decision tree, one or more packets to the second device using the selected link. The primary link and the secondary link may respectively comprise a radio frequency (RF) link and a powerline communication (PLC) link.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. A wireless network, in particular, is a type of shared media network where a plurality of nodes communicates over a wireless medium, such as, for example, using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities" (e.g., for Advanced Metering Infrastructure or "AMI" applications) and may often consist of wireless nodes in communication within a field area network (FAN). LLNs are generally considered a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

Figure 1:
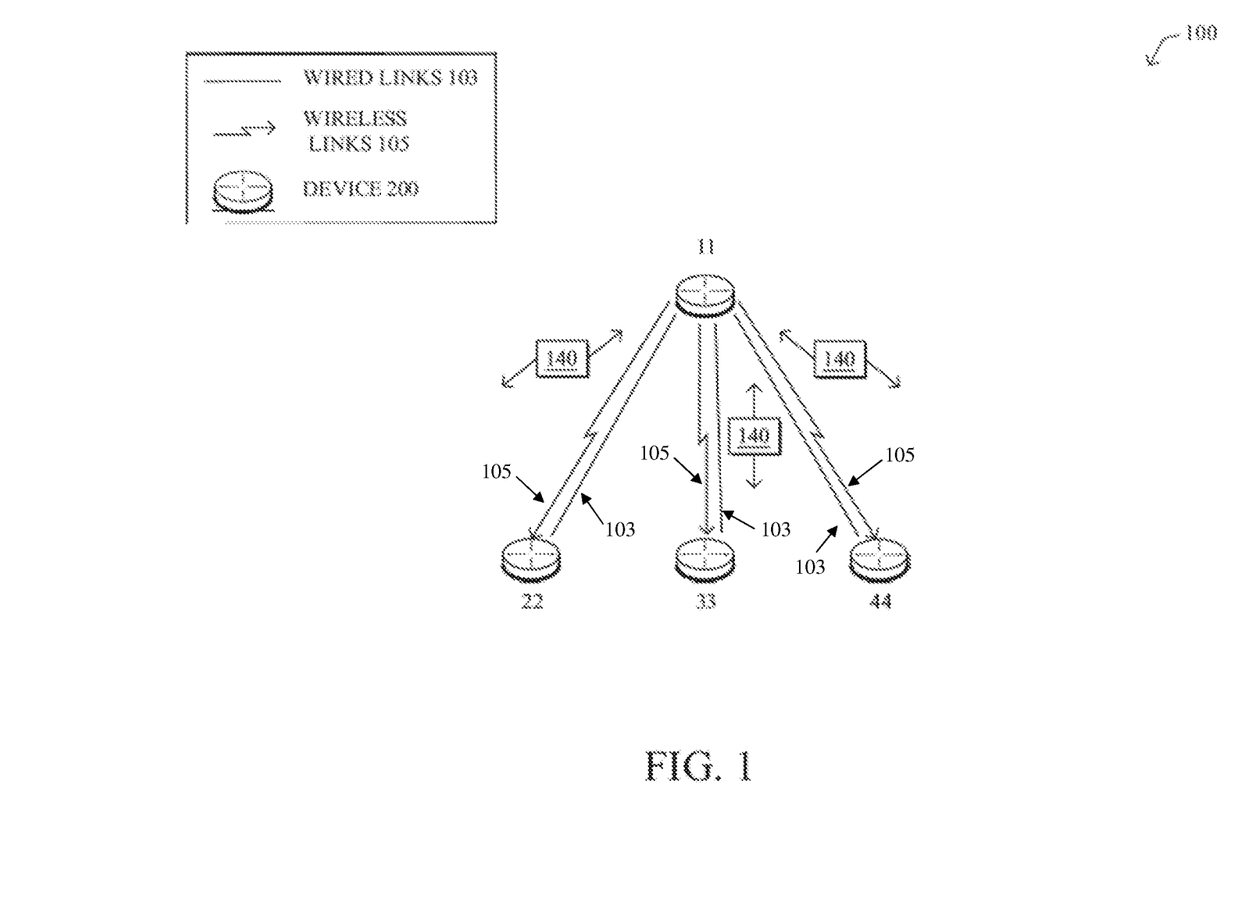
FIG. 1 illustrates an example schematic block diagram of a simplified computer network in one embodiment of the present disclosure.

FIG. 1 is a schematic block diagram of an example (and vastly simplified) computer network 100 (e.g., wireless and/or wired) illustratively comprising nodes/devices 200 (e.g., labeled as shown, "11," "22," "33," and "44") interconnected by communication links 103 and 105, as described below. In particular, certain nodes 200, such as, for example, routers, sensors, computers, radios, etc., may be in communication with other nodes 200, for example, based on distance, signal strength, current operational status, location, etc. Those skilled in the art will understand that any number of nodes, devices, links, etc. may be used in the wireless or wired network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, RF, etc.) or other shared media protocols where appropriate (e.g., PLC). As described herein, the communication may, in one embodiment, be based on dual PHY links such as, for example, links 103 and 105 (e.g., RF links and PLC links), or, generally, "multi-PHY" (for two or more different types of communication links). As used herein, PHY refers to the physical layer of the OSI model. In this context, a protocol consists of a set of rules defining how the nodes interact with each other.

Figure 2:
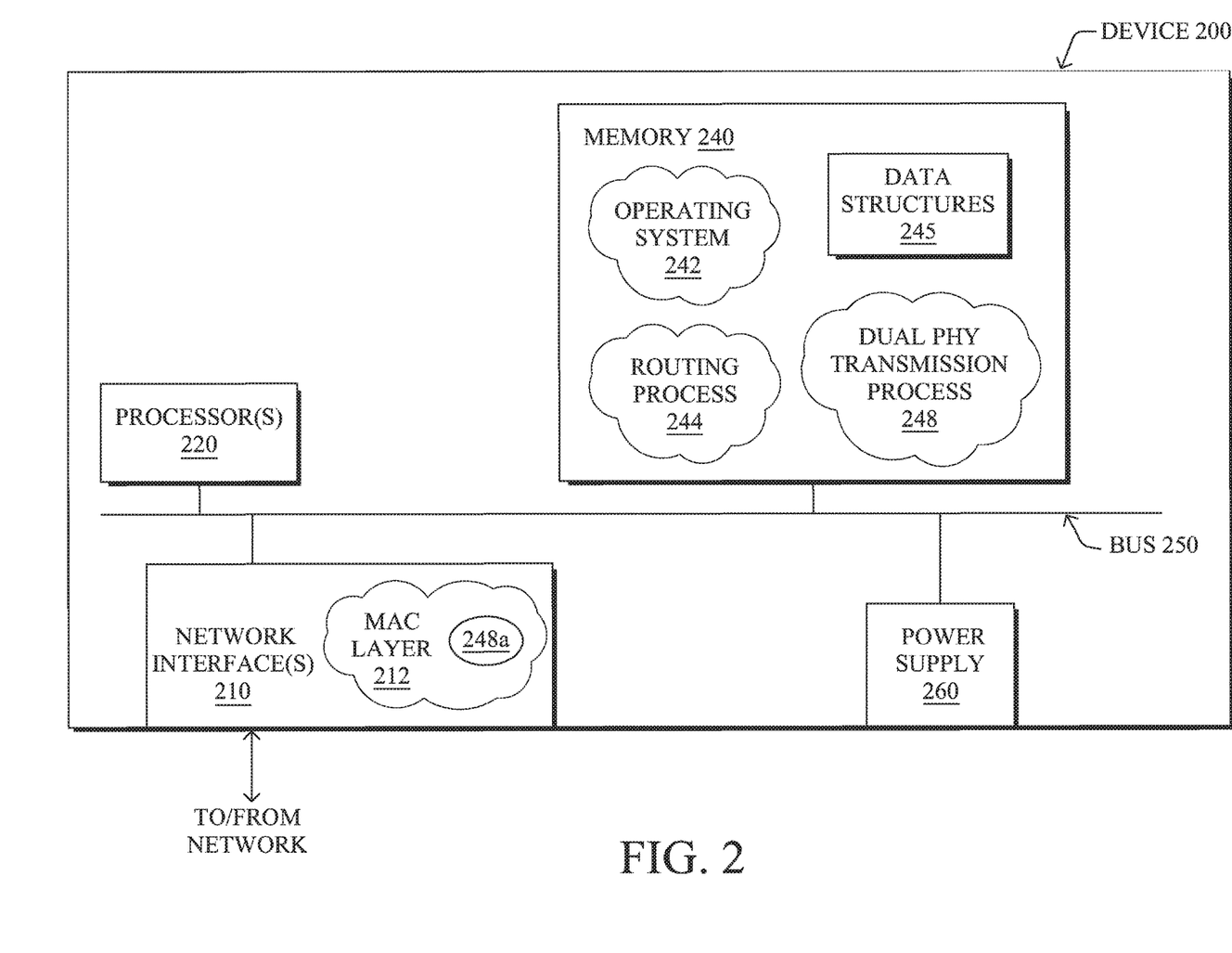
FIG. 2 illustrates an example schematic block diagram of an example device in one embodiment of the present disclosure.

FIG. 2 is a schematic block diagram of an example device 200 (e.g., an apparatus) in accordance with one embodiment of the present disclosure. The device 200 may be a node used with one or more embodiments described herein, e.g., as nodes 11-44. The device 200 may comprise one or more network interfaces 210 (e.g., a wireless link, an RC link, a PLC link, etc.), at least one processor 220, and a memory 240 interconnected by a system bus 250, as well as a power supply 260 (e.g., plug-in, battery, etc.).

The network interface(s) 210, for example, transceivers, contain the mechanical, electrical, and signaling circuitry for communicating data over wireless links and/or wired links coupled to the network 100. The network interface 210 may be configured to transmit and/or receive data using a variety of different communication protocols. The network interface may also be configured to support dual PHY based communication as described herein. In addition, the interface 210 may comprise an illustrative media access control (MAC) layer module 212 (and other layers, such as the physical or "PHY" layer, as will be understood by those skilled in the art). Note, further, that the nodes may have two or more different types of network interfaces 210, namely, wireless and/or wired/physical connections, and that the example FIG. 2 herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and a dual PHY communication process 248. Note that while the dual PHY communication process 248 is shown in centralized memory 240, alternative embodiments provide for the dual PHY communication process 248 to be specifically operated within the network interfaces 210, such as a component of MAC layer 212 (process "248a"). In one embodiment, there may be separate networks interfaces and accompanying MAC layers for separate PHY communication links.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, for example, link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

The device 200 as described herein may be part of the LLN discussed previously. An example implementation of LLNs is an "Internet of Things" network. As described above, the term "Internet of Things" or "IoT" may be used by those in the art to refer to uniquely identifiable objects or "things" and their virtual representations in a network-based architecture. In particular, the term "IoT" generally refers to the interconnection of objects (for example, smart objects), such as sensors and actuators, over a computer network (for example, IP), which may be the Public Internet or a private network. Such devices have been used in the industry for decades, usually in the form of non-IP or proprietary protocols that are connected to IP networks by way of protocol translation gateways. With the emergence of a myriad of applications (e.g., smart grid, smart cities, building and industrial automation, etc.), it has been of the utmost importance to extend the IP protocol suite for these networks.

Smart object networks, such as sensor networks, in particular, are a specific type of LLN having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver (such as, for example, RF transceiver) or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

—Load Balancing of Throughput for Multi-PHY Networks Using Decision Trees—

As noted above, when mesh network nodes experience wireless transmission problems (e.g., due to temporal changes, physical obstruction(s), propagation characteristics of the physical media, etc.), the mesh network nodes may be configured to, in lieu of the first medium (e.g., RF), communicate over a second medium (e.g., power line). The mesh network nodes, however, are typically configured to, prior to communicating over the second medium, perform multiple retransmission attempts over the first medium, thereby increasing latency due to the retransmission attempts (and a backoff time penalty). Further, given that the mesh network nodes are often configured to only a) communicate over the second medium when the first medium fails and b) only communicate over either media at any point in time, data throughput provided by the second medium oftentimes goes unused. That is, a total bandwidth offered by the first medium and the second medium is rarely realized due to mesh network nodes being configured to "prefer" the first medium over the second.

The techniques herein, therefore, enable load balancing of throughput for multi-PHY networks using decision trees. In particular, mesh network nodes comprising dual interfaces may be configured to send data (e.g., packets) in a way that maximizes the total bandwidth offered by a first medium (e.g., RF) and a second medium (e.g., power line) using the dual interfaces. Notably, the techniques herein implement one or more decision trees that determine whether a mesh network node in a mesh communication network is to communicate with another mesh network node using either the first medium or the second medium on a per packet basis. Attributes (e.g., split-points), thresholds of the attributes, and rankings of the attributes of the one or more decision trees are generated using decision tree algorithms (e.g., iterative dichotomiser 3 (ID3), C4.5, which is an extension of the earlier ID3 algorithm, etc.). Additionally, machine learning techniques (e.g., random decision forest, adaptive boosting, a gradient boosted decision tree (GBDT), etc.). may be applied to correct for "over-fitting" problem(s) presented by the one or more decision trees. Transmission metrics, collected by a mesh network node, are used as input for the one or more decision trees that output a determination as to whether the mesh network node should transmit a given packet over the first medium or the second medium. By classifying whether to send packets over a selected medium on a per packet basis, the total bandwidth and maximum throughput provided by the two media may be approached. Further, collisions in communications among the mesh network nodes are minimized.

Specifically, according to one or more embodiments of the disclosure as described in detail below, a first device of a mesh communication network may collect at least one transmission metric indicative of a primary link and a secondary link between the first device and a second device of the mesh communication network. The first device may provide the at least one transmission metric as input to one or more decision trees comprising one or more attributes that are each indicative of a threshold for a corresponding transmission metric. The first device may obtain an output from the decision tree comprising a selection of either the primary link or the secondary link. The first device may send, based on the output from the decision tree, one or more packets to the second device using the selected link. The primary link and the secondary link may respectively comprise a radio frequency (RF) link and a powerline communication (PLC) link.

Illustratively, the techniques described herein may be performed by hardware, software, and/or firmware, such as in accordance with the dual PHY communication process 248, which may include computer executable instructions executed by the processor 220 (or independent processor of interfaces 210) to perform functions relating to the techniques described herein, e.g., in conjunction with routing process 244.

Figure 3:
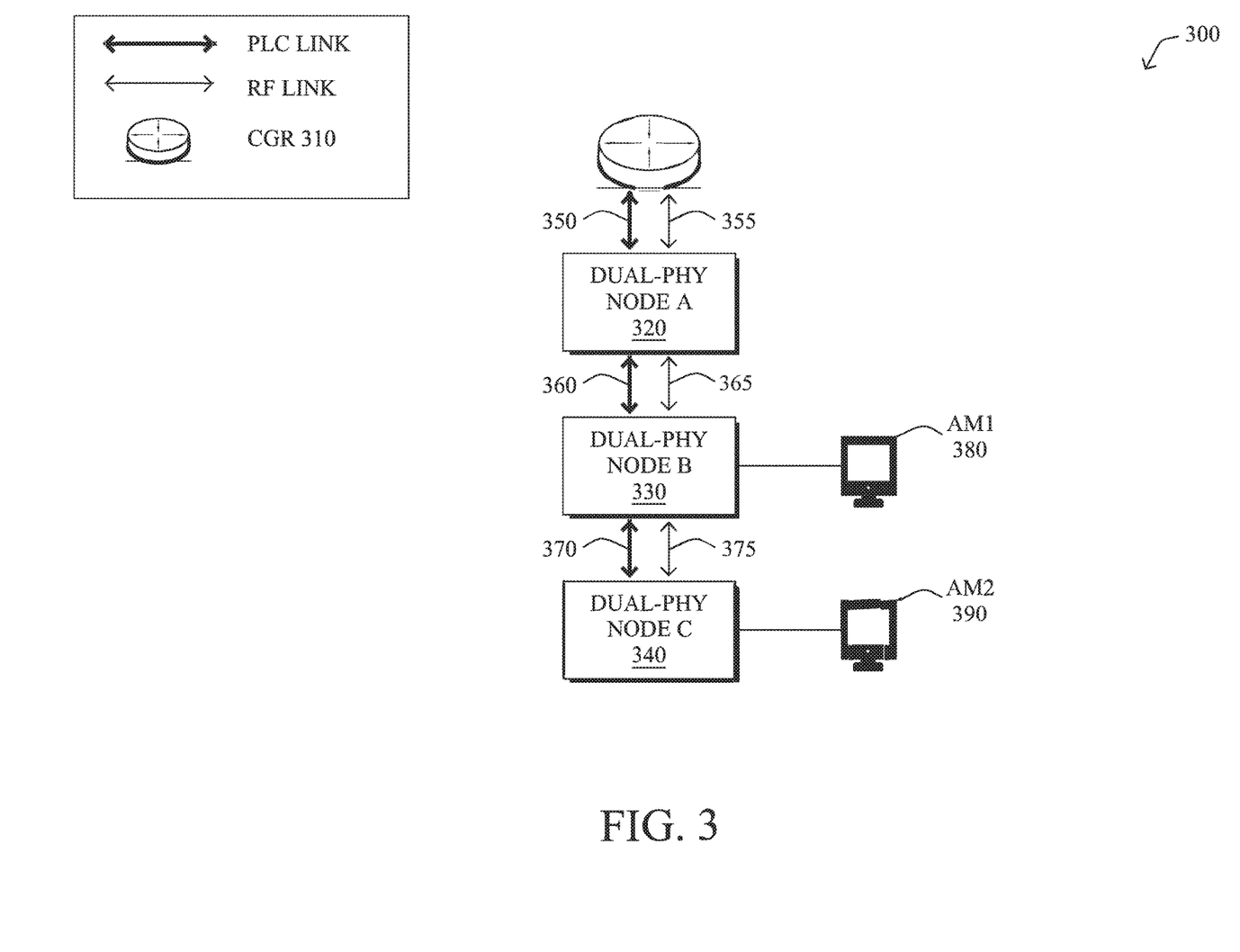
FIGS. 3-4 illustrate an example network that implements load balancing of throughput for multi-PHY networks using decision trees.

Operationally, consider FIG. 3 that shows a mesh network 300 in one embodiment of the present disclosure. The network 300 shows an example mesh network which may be utilized in a connected grid type environment with a plurality of devices including, for example, a connected grid router (CGR) 310 and multiple downstream (also known as descendent) dual PHY connected devices 320, 330, and 340. A dual PHY device, in an embodiment, is a node/device that is capable of communicating using multiple different communication links (e.g., having a primary link and a secondary link). In one embodiment, the dual PHY links may be RF and PLC communication links. It should be understood that the connected devices 320, 330, and 340 may be any suitable type of objects or nodes, such as for example, smart objects, or "things" as may be contemplated by the Internet of Things concept. In one embodiment, the devices 320, 330, and 340 may configured in a manner suitably similar to the device 200 as described in FIG. 2. In this example embodiment, advanced metering infrastructures 380 and 390 are connected to the devices 330 and 340 respectively. In various embodiments, the network 300 may include one or more mesh networks, such as, for example, Internet of Things networks.

Conventionally, in network 300, radio frequency (RF) links 355, 365, and 375 may be first used, as primary links, to communicate between devices 310, 320, 330, and 340 in the network 300 and when an RF link is inactive, power line communication (PLC) links 350, 360, and 370, as secondary links, may be utilized as appropriate. In this embodiment of the network 300, multiple link technologies may be supported such as, for example, RF and PLC. In a particular embodiment, Smart Grid AMI products such as those made by Cisco Systems, Inc. may be configured to implement the present disclosure where each device or node on the mesh network is capable of communicating using RF and PLC. As known to those skilled in the art, throughput between RF links and between PLC links are asymmetrical. Typically, the data rate of RF can be configured as 50 kbps, 150 kbps, 200 kbps, and 400 kbps or above. However, the date rate of narrow band PLC can vary from 10 kbps to 40 kbps depending on the different modulation of ROBO, BPSK, QPSK and 8PSK. Therefore, unless there is an RF link failure or inactivity, a dual PHY node chooses RF as the "preferred" uplink, and PLC as an alternative uplink to optimize network throughput. It should be appreciated that the network 300 shows an optimally performing network state where the RF links 355, 365, and 375 are all active while later figures show network states where certain node to node RF links are inactive and therefore PLC links are utilized.

Each of the devices 310, 320, 330, and 340 in the network 300, however, may be configured send packets over either a respective RF link or PLC link using one or more decision trees. Notably, with reference now to FIG. 4, the device 320 is shown communicating with the device 310 using the PLC link 350, the device 330 is shown communicating with the device 320 using the RF link 362, and the device 340 is shown communicating with the device 330 using the PLC link 370. In particular, the devices 320, 330, and 340 may be configured to collect transmission metrics indicative of transmission conditions for respective PLC links 350, 360, and 370 and RF links 352, 362, 372. The transmission metrics may include: a number of RF retransmission attempts, a number of PLC retransmission attempts, an expected transmission count (ETX), latency between the device and neighboring devices of the device, a number of visible neighboring devices of the device, a received signal strength indicator (RSSI) of the device, a link quality indicator (LQI) of the device, a transmit to queue length ratio of the device, etc.

Figure 4:
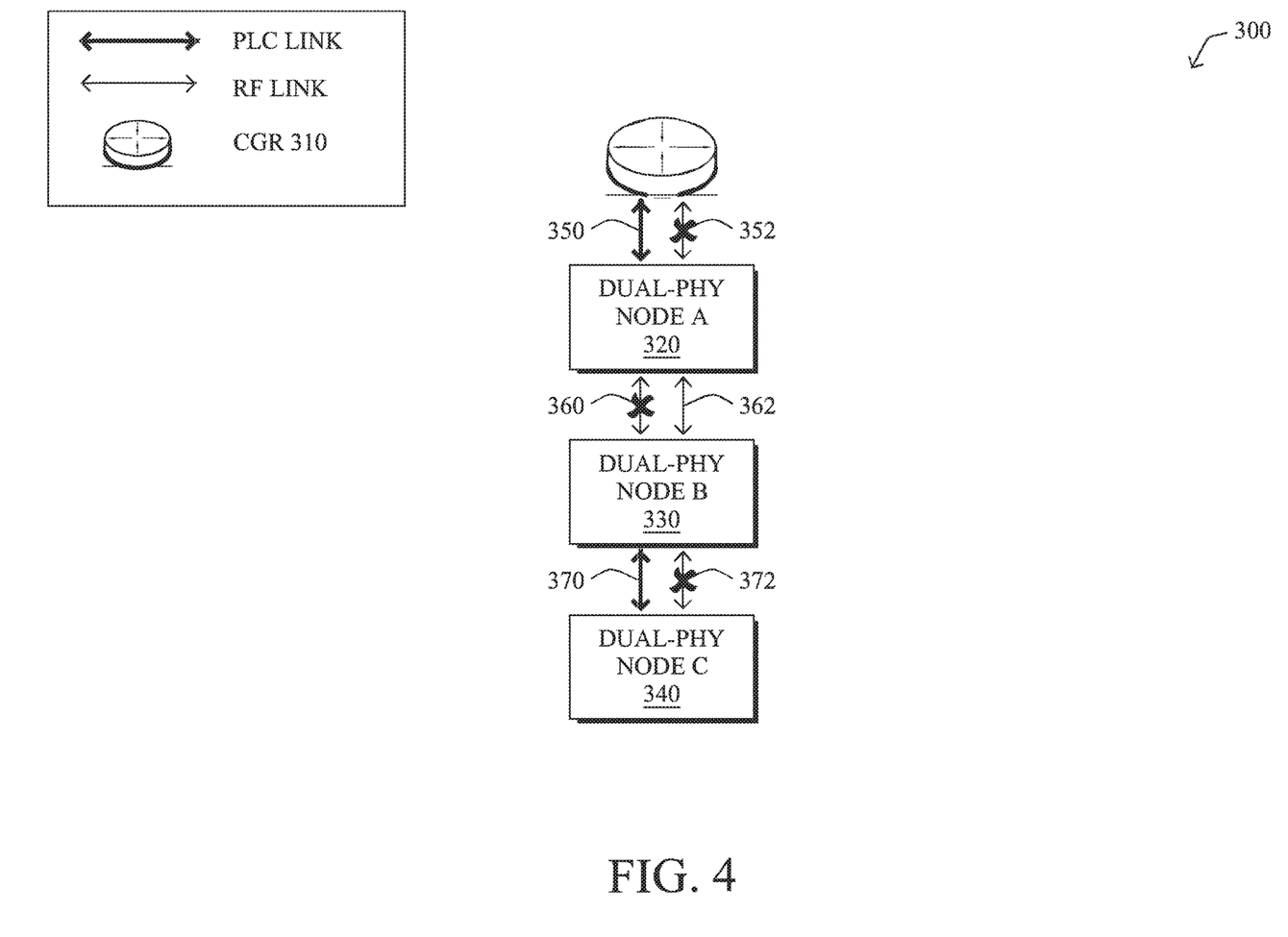

The collected transmission metrics may then be used as input to one or more decision trees, where output of the one or more decision trees include selection of whether a particular device (e.g., devices 320, 330, and 340) is to transmit a given packet over a particular communication link (e.g., PLC links 350, 360, and 370 or RF links 352, 362, 372). A suitable decision tree for the techniques described herein may be generated using any appropriate decision tree algorithm well-understood in the art, such as ID3, C4.5, etc. The decision tree, as will be described in greater detail herein below, comprises one or more attributes that correspond to respective transmission metrics and divide tuples into classes. Further, it is contemplated that the one or more decision trees may be generated by the particular device (e.g., devices 320, 330, and 340) itself or off-site by another device of the network 300 (e.g., CGR 310) or in communication with the network (e.g., a cloud device). It is understood that application of the collected transmission metrics to the one or more decision trees generally does not require computing resources beyond what the devices 310, 320, 330, and 340 (or any other small embedded system platform offered in mesh networks) conventionally offer, so implementation of the one or more decision trees may be performed on a per-device basis. However, it is contemplated that, like for generation of the one or more decision trees, that implementation of the one or more decisions using the transmission metrics may be perform off-site (e.g., not on the device).

With more detail regarding attributes (or split-sets) of a given decision tree, the decision tree algorithms may determine rankings (and thresholds) of a given attribute (that corresponds to a transmission metric type). In terms of refining a particular attribute, three general situations are contemplated:

1. Attributes of a decision tree are discrete and do not fit in binary decision tree model, so each partition of the decision tree is a branch;
2. Attributes of the decision tree are discrete and fit in a binary decision tree model, so two branches emanate from a given partition (e.g., one is "belongings to this subject" and the other is "not belongings to this subset"); or
3. Attributes of the decision tree are continuous values, so threshold for attributes are identified (e.g., a partition is separated based on whether a measurement is greater or less than the threshold).

Figure 5:
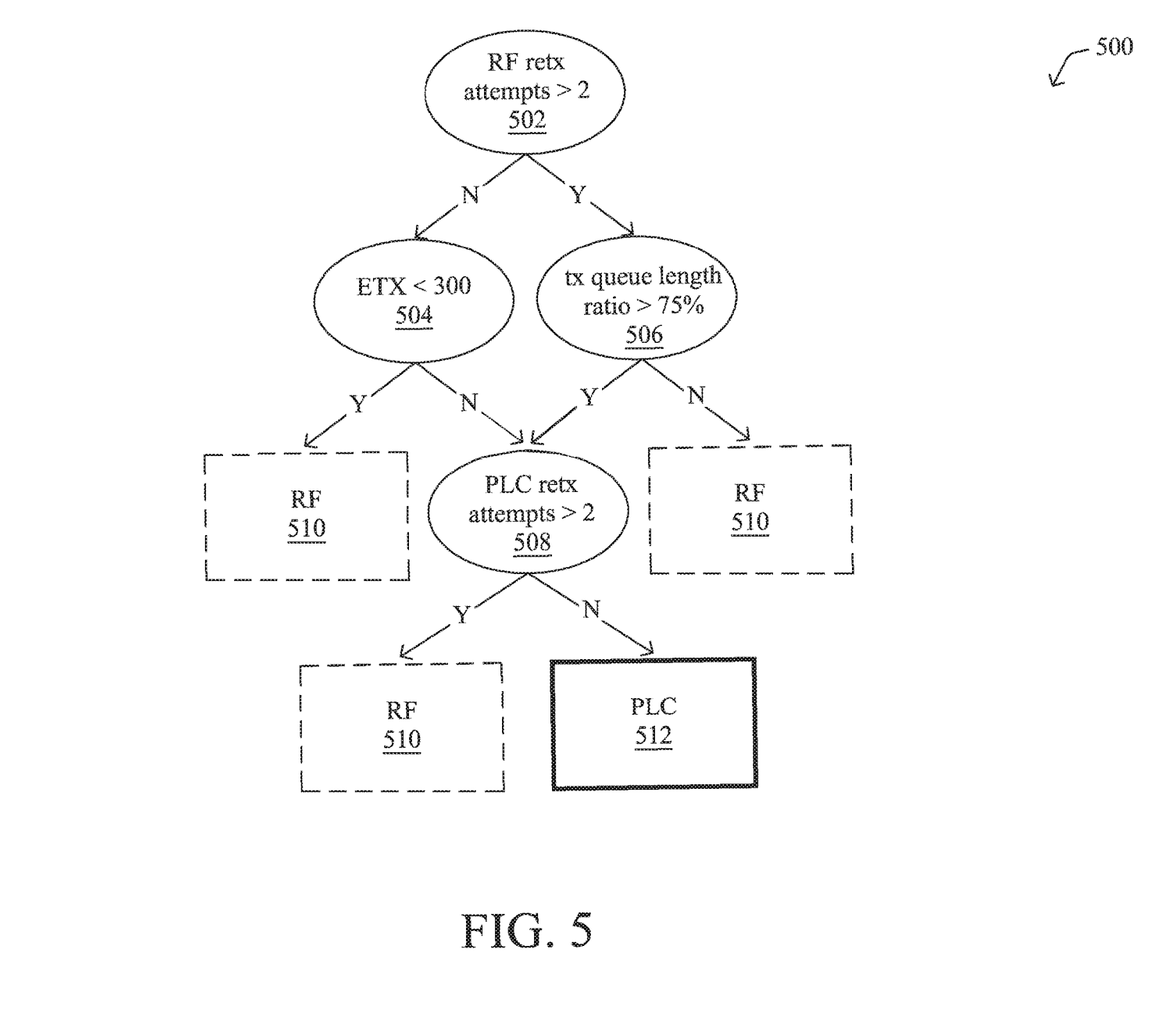
FIGS. 5-7 illustrate example decision trees in accordance with one embodiment of the present disclosure.

Turning now to FIG. 5, an example decision tree 500 for determining whether a device is to transmit a given packet of a particular communication link is shown. In particular, as show, attributes 502-508 for the decision tree 500 may include a RF retransmission attempt 502, an ETX count 504, a transmit to queue length ratio 506, and a PLC retransmission attempt 508. As described above, threshold for the attributes may be determined using decision tree algorithms (e.g., ID3, CD4.5, etc.) that classify based on the concepts of entropy and gain. Further, while the attributes of the decision tree 500 may indicate only certain attributes, it is contemplated that the decision tree algorithms may include other attributes that correspond to any of the transmission metrics that a wireless mesh device may collect (e.g., latency between the device and neighboring devices of the device, a number of visible neighboring devices of the device, a RSSI of the device, a LQI of the device, etc.).

Using the decision tree 500, a wireless mesh device may use collected transmission metrics as input for the decision tree 500 to determine whether to send a packet for an RF link 510 or PLC link 512. In an example, a wireless mesh device, prior to sending a packet, may gather transmission metrics that indicate a RF retransmission attempt count of three and a transmit to queue length ratio of 70%. Using these transmission metrics as input to the decision tree 500 would output a selection of the PLC link 510 for transmission of the packet.

It is to be understood that implementing a single decision tree (e.g., the decision tree 500) may lead to an "over-fitting" problem (as understood in the art), where the decision tree may not be well-suited for predicting outcomes. The techniques herein may implement the use of a machine learning-based processes to address the "over-fitting" problem. In particular, multiple decision trees, as shown in FIGS. 6-7 may be generated, using, for example, a random decision forest, adaptive boosting, and a gradient boosted decision tree (GBDT), etc. that lead to more robustness and a reduction of loss as much as possible by correcting residual gaps from previously generated decision trees until an acceptable residual gap is identified.

Figure 6:
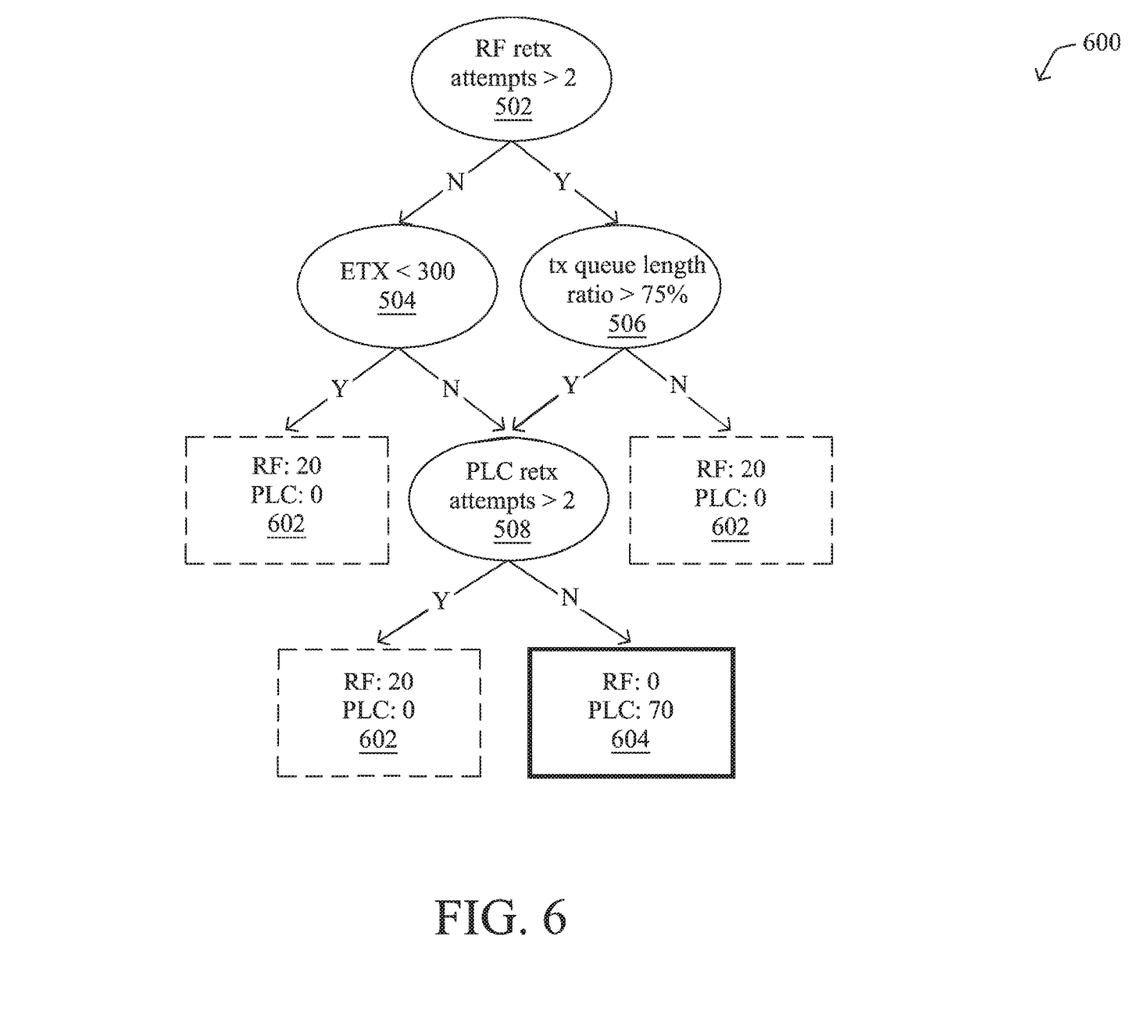
Figure 7:
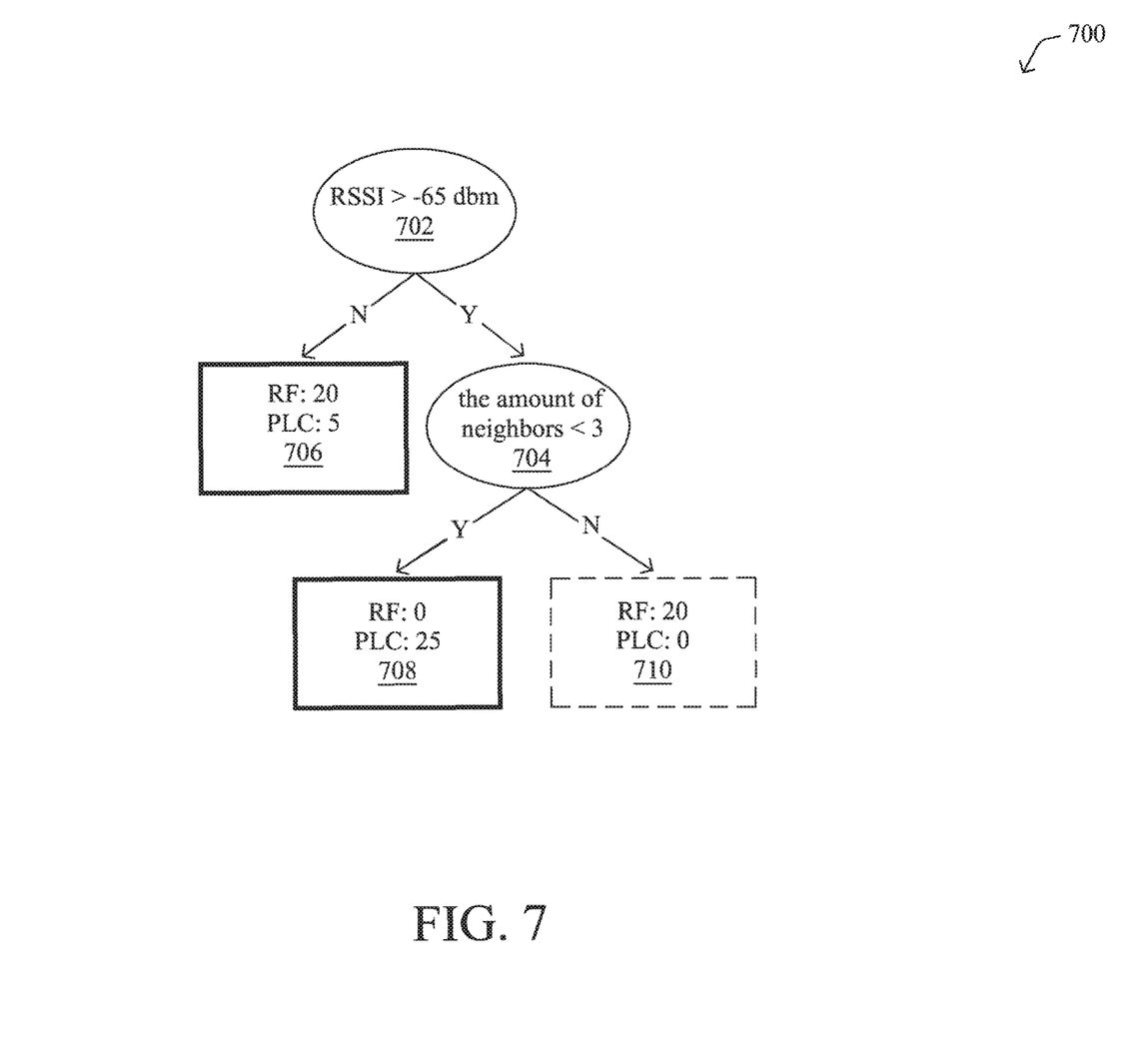

With reference to FIG. 6, a percentage probability for a first decision tree 600, instead of a discrete decision to select either a RF links 602 or a PLC link 604 is shown. In the example show, a wireless mesh device may receive a selection to send a packet over the RF link 602 if a final sum of a RF link probability is larger than a final sum of a PLC link probability (and vice versa), where the scale of the percentage probability for the decision tree 600 is 100. In the case of the decision tree 600, 40 units of percentage probability for the RF links 602 and 30 units of percentage probability for the PLC link are unused. Therefore, as shown in FIG. 7, a second decision 700 may be generated to reduce these unused gaps. In particular, the second decision tree 700 may include additional attributes 702-704, including an RSSI attribute 702 and a number of neighbors attribute 704. As shown, additional percentages of probability 706-710 may be included in the second decision tree that correct the unused gaps of the first decision tree 600.

In an example, a wireless mesh device, prior to sending a packet, may gather transmission metrics that indicate a RF retransmission attempt count of three, a transmit to queue length ratio of 72%, and an RSSI of −60 milliwatt (dBm). Using these transmission metrics as input to the decision trees 600-700 would lead to a determination that the probability 706 of a RF link (20) is greater than a PLC link (5). Thus, a selection of the RF link (e.g., a primary link) is chosen to send the packet.

Figure 8:
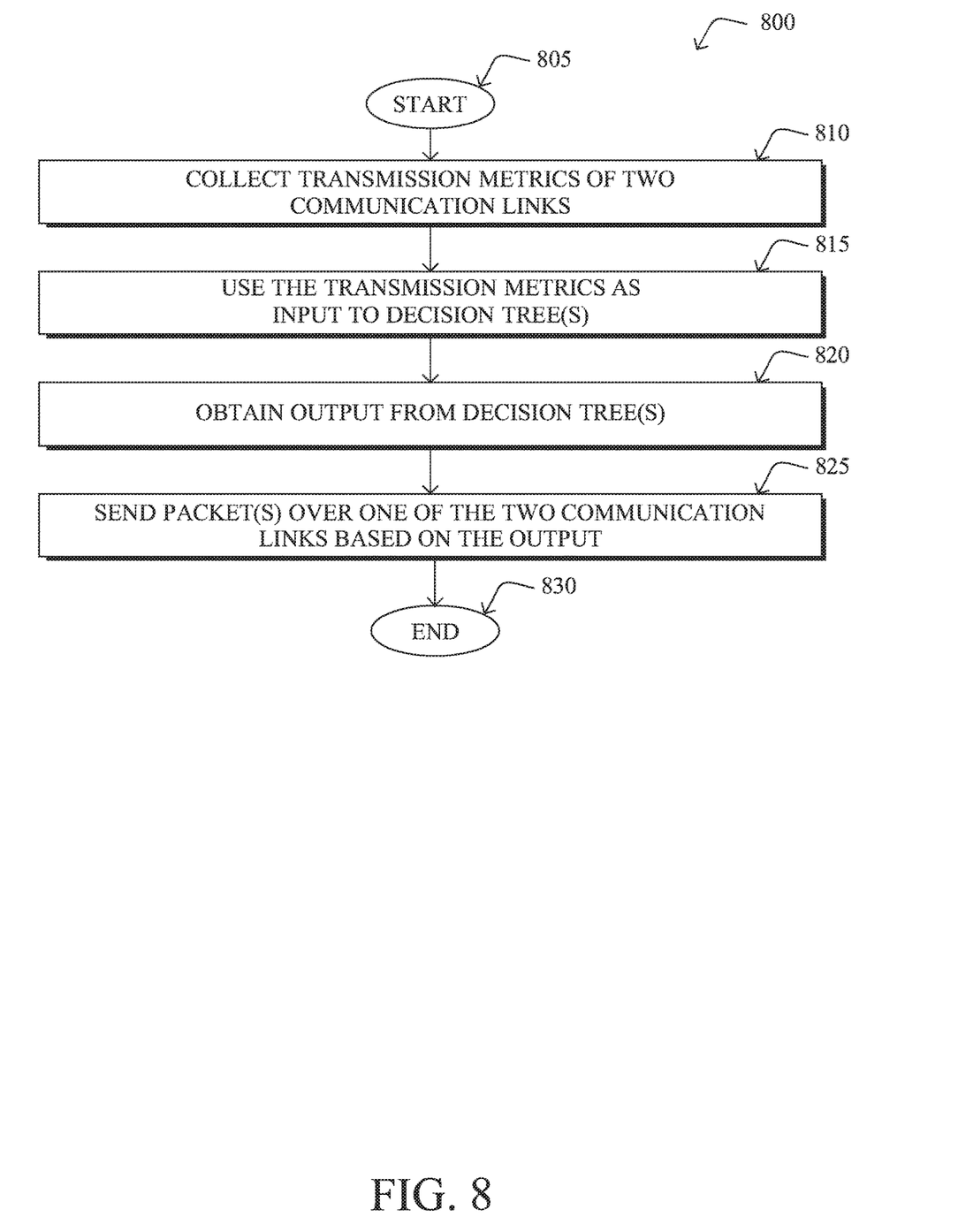
FIG. 8 illustrates an example simplified procedure for load balancing of throughput for multi-PHY networks using decision trees.

FIG. 8 illustrates an example simplified procedure for the load balancing of throughput for multi-PHY networks using decision trees in accordance with one or more embodiments described herein. For example, a non-generic, specifically configured device (e.g., device 200, an apparatus, etc.) may perform procedure 800 by executing stored instructions (e.g., process 248). The procedure may start at step 805, and continues to step 810, where, as described in greater detail above, device may collect transmission metrics of two communication links. In particular, a first device of a mesh communication network may collect at least one transmission metric indicative of a primary link and a secondary link between the first device and a second device of the mesh communication network. The primary link and the secondary link may respectively comprise a radio frequency (RF) link and a powerline communication (PLC) link. The at least one transmission metric is selected from the group consisting of a number of retransmission attempts by the first device on the primary link, a number of retransmission attempts by the first device on the secondary link, an expected transmission count (ETX) of the first device, latency between the first device and neighboring devices of the first device, a number of visible neighboring devices of the first device, a received signal strength indicator (RSSI) of the first device, a link quality indicator (LQI) of the first device, and a transmit to queue length ratio of the first device. Further, the mesh communication network may be a Connected Grid mesh network (CG-Mesh) for Advanced Metering Infrastructure (AMI).

In step 815, the device may use the transmission metrics as input to decision tree(s). In particular, the first device may provide the at least one transmission metric as input to one or more decision trees comprising one or more attributes that are each indicative of a threshold for a corresponding transmission metric. The one or more attributes may be generated and ranked using a decision tree algorithm selected from the group consisting of an iterative dichotomiser 3 (ID3) and C4.5. The one or more decision trees may be generated using a machine learning process selected from the group consisting of a random decision forest, adaptive boosting, and a gradient boosted decision tree (GBDT). The first device may generate the one or more decision tree. Alternatively, the first device may receive the one or more decision trees from a border router of the mesh communication network configured to generate the one or more decision trees.

In step 820, the device may obtain output from the decision tree(s). In particular, the first device may obtain an output from the decision tree comprising a selection of either the primary link (e.g., an RF link) or the secondary link (e.g., a PLC link). The selection of either the primary link or the secondary link may be based on a percentage probability of the primary link being greater or less than the secondary link according to the machine learning process In step 830, the device point may send packet(s) over one of the two communication links based on the output. In particular, the first device may send, based on the output from the decision tree, one or more packets to the second device using the selected link. Further, the first device may receive one or more other packets from a third device of the mesh communication network using a) a RF link between the first device and the third device when the selected link is a PLC link and b) a PLC link between the first device and the third device when the selected link is an RF link.

The simplified example procedure 800 then ends at step 830.

It should be noted that certain steps within procedure 800 may be optional as described above, and the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for load balancing of throughput for multi-PHY networks using decision trees. In some aspects, a device of a mesh network that implements communication over two media may collect transmission metrics that are used as input to one or more decision tree(s) that output a selection of a certain communication link to be used for transmission of a packet (e.g., a RF link, a PLC link, etc.). By classifying whether to send packets over a selected medium on a per packet basis, the total bandwidth and maximum throughput provided by the two media may be approached. Further, collisions in communications among the mesh network nodes are minimized.

While there have been shown and described illustrative embodiments that provide for load balancing of throughput for multi-PHY networks using decision trees, it is to be understood that various other adaptations and modifications may be made within the spirit and scope of the embodiments herein. For example, while certain embodiments are described herein with respect to using certain communication media (e.g., RF and PLC), other communication media are expressly contemplated (e.g., Bluetooth (BT), wireless fidelity (Wi-Fi) based on any IEEE 802.11 standard, light fidelity (Li-Fi), near field communication (NFC), etc.)

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    collecting, by a first device of a mesh communication network, at least one transmission metric indicative of a radio frequency (RF) link and a powerline communication (PLC) link between the first device and a second device of the mesh communication network;
    providing, by the first device, the at least one transmission metric as input to one or more decision trees comprising one or more attributes that are each indicative of a threshold for a corresponding transmission metric;

obtaining, by the first device, an output from the decision tree comprising a selection of either the RF or the PLC link as a selected link; and
sending, by the first device and based on the output from the decision tree, one or more packets to the second device using the selected link.

2. The method as in claim 1, wherein the one or more attributes are generated and ranked using a decision tree algorithm selected from the group consisting of an iterative dichotomiser 3 (ID3) and C4.5.

3. The method as in claim 1, wherein the one or more decision trees are generated using a machine learning process selected from the group consisting of a random decision forest, adaptive boosting, and a gradient boosted decision tree (GBDT).

4. The method as in claim 3, wherein the selection of either the RF link or the PLC link is based on a percentage probability of the RF link being greater or less than the PLC link according to the machine learning process.

5. The method as in claim 1, wherein the at least one transmission metric is selected from the group consisting of a number of retransmission attempts by the first device on the RF link, a number of retransmission attempts by the first device on the PLC link, an expected transmission count (ETX) of the first device, latency between the first device and neighboring devices of the first device, a number of visible neighboring devices of the first device, a received signal strength indicator (RSSI) of the first device, a link quality indicator (LQI) of the first device, and a transmit to queue length ratio of the first device.

6. The method as in claim 1, further comprising:
generating, by the first device, the one or more decision trees.

7. The method as in claim 1, further comprising:
receiving, by the first device, the one or more decision trees from a border router of the mesh communication network configured to generate the one or more decision trees.

8. The method as in claim 1, further comprising:
receiving, by the first device, one or more other packets from a third device of the mesh communication network using a) a RF link between the first device and the third device when the selected link is the PLC link and b) a PLC link between the first device and the third device when the selected link is the RF link.

9. The method as in claim 1, wherein the mesh communication network is a Connected Grid mesh network (CG-Mesh) for Advanced Metering Infrastructure (AMI).

10. An apparatus, comprising:
a processor;
a primary transceiver configured to communicate in a mesh communication network;
a secondary transceiver configured to communicate in the mesh communication network; and
a memory configured to store a process executable by the processor, the process when executed by the processor operable to:
collect at least one transmission metric indicative of a radio frequency (RF) link and a powerline communication (PLC) link between the apparatus and a particular device of the mesh communication network;
provide the at least one transmission metric as input to one or more decision trees comprising one or more attributes that are each indicative of a threshold for a corresponding transmission metric;
obtain an output from the decision tree comprising a selection of either the RF or the PLC link as a selected link; and
send, based on the output from the decision tree, one or more packets to the particular device using the selected link.

11. The apparatus as in claim 10, wherein the one or more attributes are generated and ranked using a decision tree algorithm selected from the group consisting of an iterative dichotomiser 3 (ID3) and C4.5.

12. The apparatus as in claim 10, wherein the one or more decision trees are generated using a machine learning process selected from the group consisting of a random decision forest, adaptive boosting, and a gradient boosted decision tree (GBDT).

13. The apparatus as in claim 12, wherein the selection of either the RF link or the PLC link is based on a percentage probability of the RF link being greater or less than the PLC link according to the machine learning process.

14. The apparatus as in claim 10, wherein the at least one transmission metric is selected from the group consisting of a number of retransmission attempts by the apparatus on the RF link, a number of retransmission attempts by the apparatus on the PLC link, an expected transmission count (ETX) of the apparatus, latency between the apparatus and neighboring devices of the apparatus, a number of visible neighboring devices of the apparatus, a received signal strength indicator (RSSI) of the apparatus, a link quality indicator (LQI) of the apparatus, and a transmit to queue length ratio of the apparatus.

15. The apparatus as in claim 10, wherein the process when executed by the processor, further comprises:
generate the one or more decision trees.

16. The apparatus as in claim 10, wherein the process when executed by the processor, further comprises:
receive one or more decision trees from a border router of the mesh network configured to generate the one or more decision trees.

17. The apparatus as in claim 10, wherein the process when executed by the processor, further comprises:
receive one or more other packets from a third device of the mesh network using a) a RF link between the apparatus and the third device when the selected link is the PLC link and b) a PLC link between the apparatus and the third device when the selected link is the RF link.

18. A tangible, non-transitory, computer-readable medium storing program instructions that cause a first device of a mesh communication network to execute a process comprising:
collecting at least one transmission metric indicative of a radio frequency (RF) link and a powerline communication (PLC) link between the first device and a second device of the mesh communication network;
providing the at least one transmission metric as input to one or more decision trees comprising one or more attributes that are each indicative of a threshold for a corresponding transmission metric;
obtaining an output from the decision tree comprising a selection of either the RF or the PLC link as a selected link; and
sending based on the output from the decision tree, one or more packets to the second device using the selected link.

19. The tangible, non-transitory, computer-readable medium as in claim 18, wherein the one or more attributes are generated and ranked using a decision tree algorithm selected from the group consisting of an iterative dichotomiser 3 (ID3) and C4.5.

20. The tangible, non-transitory, computer-readable medium as in claim 18, wherein the at least one transmission metric is selected from the group consisting of a number of retransmission attempts by the first device on the RF link, a number of retransmission attempts by the first device on the PLC link, an expected transmission count (ETX) of the first device, latency between the first device and neighboring devices of the first device, a number of visible neighboring devices of the first device, a received signal strength indicator (RSSI) of the first device, a link quality indicator (LQI) of the first device, and a transmit to queue length ratio of the first device.

* * * * *